US011911889B1

(12) United States Patent
Pascua

(10) Patent No.: US 11,911,889 B1
(45) Date of Patent: Feb. 27, 2024

(54) SOCKET TETHER SYSTEM

(71) Applicant: Edward K. P. Pascua, Kekaha, HI (US)

(72) Inventor: Edward K. P. Pascua, Kekaha, HI (US)

( * ) Notice: Subject to any disclaimer, the term of this patent is extended or adjusted under 35 U.S.C. 154(b) by 46 days.

(21) Appl. No.: 17/580,629

(22) Filed: Jan. 20, 2022

(51) Int. Cl.

| | |
|---|---|
| ***A45F 5/00*** | (2006.01) |
| ***A45F 5/02*** | (2006.01) |
| ***B25H 3/00*** | (2006.01) |
| *B25B 13/06* | (2006.01) |

(52) U.S. Cl.
CPC ............... *B25H 3/00* (2013.01); *A45F 5/021* (2013.01); *A45F 2005/006* (2013.01); *A45F 2200/0575* (2013.01); *B25B 13/06* (2013.01)

(58) Field of Classification Search
CPC .............. A45F 2200/0575; A45F 5/021; A45F 2005/006; A45F 5/00; Y10T 24/1397; B25H 3/00; B25B 13/06
See application file for complete search history.

(56) References Cited

U.S. PATENT DOCUMENTS 4,558,495 A * 12/1985 Olsen .................... B25B 33/005 24/298
4,579,356 A * 4/1986 Welborn ............... B23B 45/006 248/314
4,615,653 A * 10/1986 Watson ................. B23B 45/006 279/147
5,815,977 A * 10/1998 Hill, Jr. .................. A01K 87/00 43/25
6,216,319 B1 4/2001 Elkins
6,422,622 B1 7/2002 Bernard
6,530,131 B1 * 3/2003 Hopkins .................. A45F 5/00 24/301
8,567,290 B2 10/2013 Moreau et al.
10,383,429 B2 8/2019 Moreau et al.
10,548,458 B1 2/2020 Sankey
10,716,390 B2 7/2020 Wagner et al.
2006/0261113 A1 * 11/2006 Godshaw ............... A45C 7/005 206/349
2020/0194747 A1 * 6/2020 Rudolph ............. H01M 50/213
2021/0137250 A1 * 5/2021 Foster ....................... A45F 5/00

OTHER PUBLICATIONS

Tool Tether Cure. Product Listing [online]. Scaffold Worker Blog [posted on Jul. 1, 2012; retrieved on Dec. 18, 2020]. Retrieved from the Internet: <URL: https://scaffoldworker.blogspot.com/2012/07/tool-tether-cure.html>.

(Continued)

*Primary Examiner* — Robert Sandy
*Assistant Examiner* — Michael S Lee
(74) *Attorney, Agent, or Firm* — Cramer Patent & Design PLLC; Aaron R. Cramer

(57) ABSTRACT

A socket tether system is a traditional socket wrench having a socket tethered to the socket wrench. The system has a first lanyard which is configured to connect a tool and a user. The first lanyard extends between a first lanyard and a second lanyard. The second lanyard is configured to make a connection between the tool and an auxiliary tool. The lanyard system is configured to prevent an auxiliary tool associated with the tool from falling when the auxiliary tool becomes disengaged from the tool.

11 Claims, 4 Drawing Sheets

(56) References Cited

OTHER PUBLICATIONS

Proto® Tether-Ready 9 Piece Folding Hex Key Set Item #:J4993-TT. Product Listing [online]. Brook Marine Equipment Trading [retrieved on Dec. 18, 2020]. Retrieved from the Internet: <URL: https://www.brookindustrialtools.com/inventory/proto-tether-ready-9-piece-folding-hex-key-set/>.

Fastway Tethered 7-Way Trailer Connector Cover with Tether. Product Listing [online]. copyright etrailer.com [retrieved on Dec. 18, 2020]. Retrieved from the Internet: <URL: https://www.etrailer.com/comparison.aspx?pc=FA82-00-3315&pc2=PK11761>.

* cited by examiner

SOCKET TETHER SYSTEM

RELATED APPLICATIONS

Non-applicable.

FIELD OF THE INVENTION

The present invention generally relates to a tether system and more specifically to a socket tether system.

BACKGROUND OF THE INVENTION

Workers wearing safety harnesses while working at elevated locations above the ground are a common sight. These safety harnesses are required by federal regulations as well as safe work practices. In addition to people, regulations also require tethering of tools as well. If not tethered, should a tool fall from an elevated height, severe injuries or even death can occur should a person be hit. Such tools can also damage surfaces and equipment below, resulting in costly repair bills. A hand tool that is commonly used is the ratchet wrench.

Even if the wrench should be attached to a tether, the socket itself can accidentally fall off, resulting in the same type of carnage. Unfortunately, such sockets are difficult to tether due to their small size, tubular shape, and their need to rotate during use. Accordingly, there exists a need for a means by which sockets attached to ratcheting wrenches can be safely restrained to prevent falling. The development of the Socket Tether System is such a solution.

SUMMARY OF THE INVENTION

The disadvantages of the prior art are overcome by the present invention in providing a lanyard system that has a first lanyard configured to connect a tool and a user, the first lanyard extends between a first lanyard first end and a first lanyard second end, and a second lanyard configured to make a connection between the tool and an auxiliary tool. The second lanyard extends between a second lanyard first end and a second lanyard second end.

The first lanyard first end may include a first lanyard first connection configured to attach to the tool. The first lanyard first connection may be selected from the group consisting of one or more loops, one or more clips, one or more hooks, one or more knots, one or more hook and loop fasteners, one or more integral connections, one or more friction fits, one or more pressure fits, one or more mating engagements, one or more dovetail connections, one or more tongue in groove connections, one or more clamps, or one or more key and key slots. The first lanyard second end may include a first lanyard second connection configured to attach to the user. The first lanyard second connection may be selected from the group consisting of one or more loops, one or more clips, one or more hooks, one or more knots, one or more hook and loop fasteners, one or more integral connections, one or more friction fits, one or more pressure fits, one or more mating engagements, one or more dovetail connections, one or more tongue in groove connections, one or more clamps, or one or more key and key slots.

The second lanyard first end may include a second lanyard first connection configured to attach to the tool. The second lanyard first connection may be selected from the group consisting of one or more loops, one or more clips, one or more hooks, one or more knots, one or more hook and loop fasteners, one or more integral connections, one or more friction fits, one or more pressure fits, one or more mating engagements, one or more dovetail connections, one or more tongue in groove connections, one or more clamps, or one or more key and key slots. The second lanyard second end may include a second lanyard second connection configured to attach to the user. The second lanyard second connection may be selected from the group consisting of one or more loops, one or more clips, one or more hooks, one or more knots, one or more hook and loop fasteners, one or more integral connections, one or more friction fits, one or more pressure fits, one or more mating engagements, one or more dovetail connections, one or more tongue in groove connections, one or more clamps, or one or more key and key slots. The user may connect the tool with the first lanyard first end of the first lanyard and may connect the first lanyard second end with a user's belt. The user may connect the tool with the first lanyard first end of the first lanyard and connects the first lanyard second end with a user's pants. The user may select the auxiliary tool and connects it with the second lanyard second end of the second lanyard and connects the second lanyard first end with the tool. The lanyard system may be configured to prevent loss of the auxiliary tool of the tool.

The lanyard system may be configured to prevent an auxiliary tool associated with the tool from falling from one or more heights when the auxiliary tool becomes disengaged from the tool. The lanyard system may be configured to prevent an auxiliary tool associated with the tool from falling into a piece of equipment when the auxiliary tool becomes disengaged from the tool. The lanyard system may be utilized during foreign material exclusion during critical path assembly. The lanyard system may be utilized in a millwright trade. The lanyard system may be utilized with a power plant turbine. The lanyard system may be utilized with a generator assembly. The lanyard system may be utilized with an overhaul disassembly.

BRIEF DESCRIPTION OF THE DRAWINGS

These and other features, aspects, and advantages of the present disclosure will become better understood with regard to the following description, appended claims, and accompanying drawings where:

DESCRIPTIVE KEY

Figure 1:
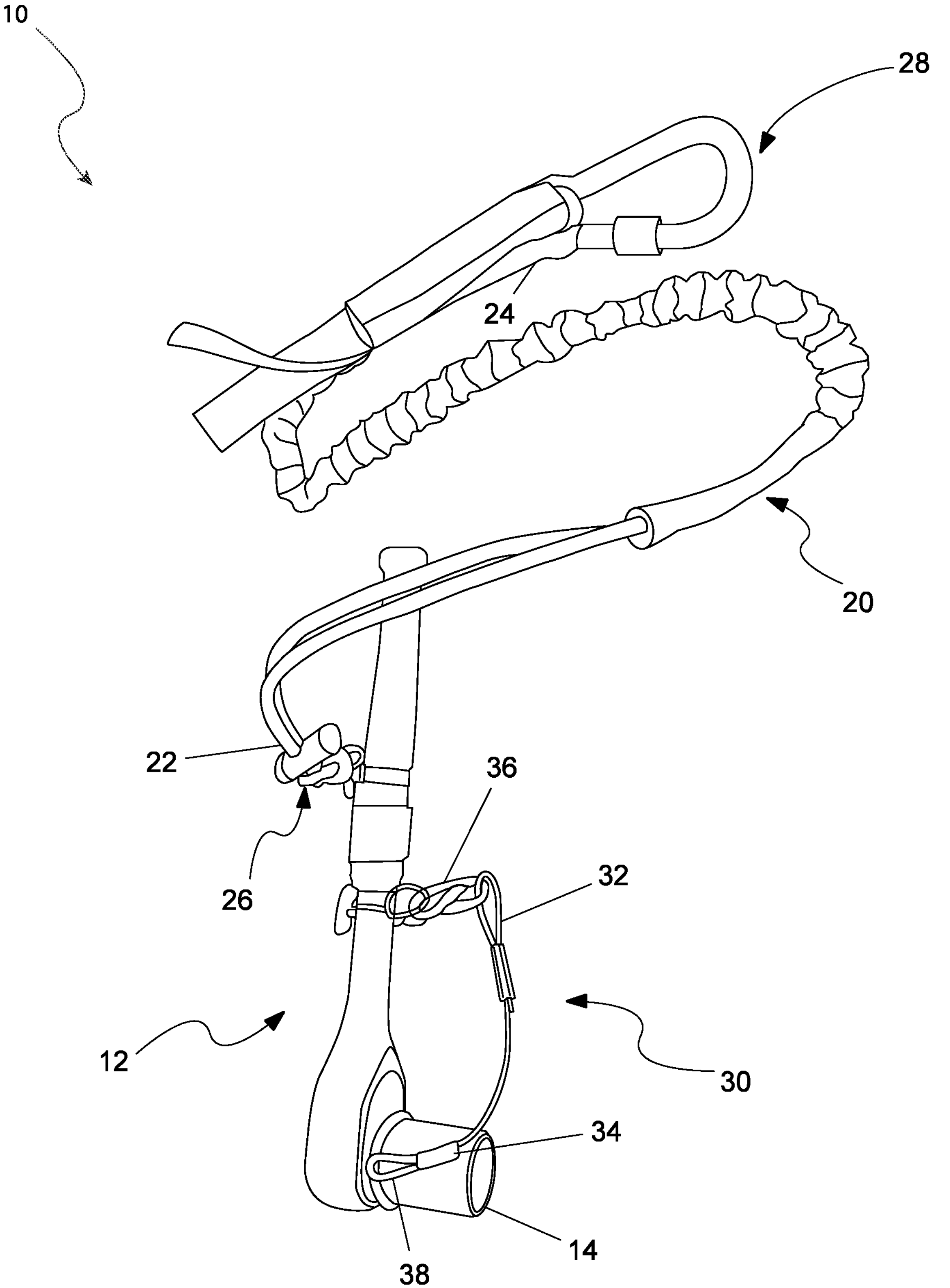
FIG. 1 is a perspective view of a lanyard system configured for removable attachment for a tool, according to an embodiment of this disclosure.
Figure 2:
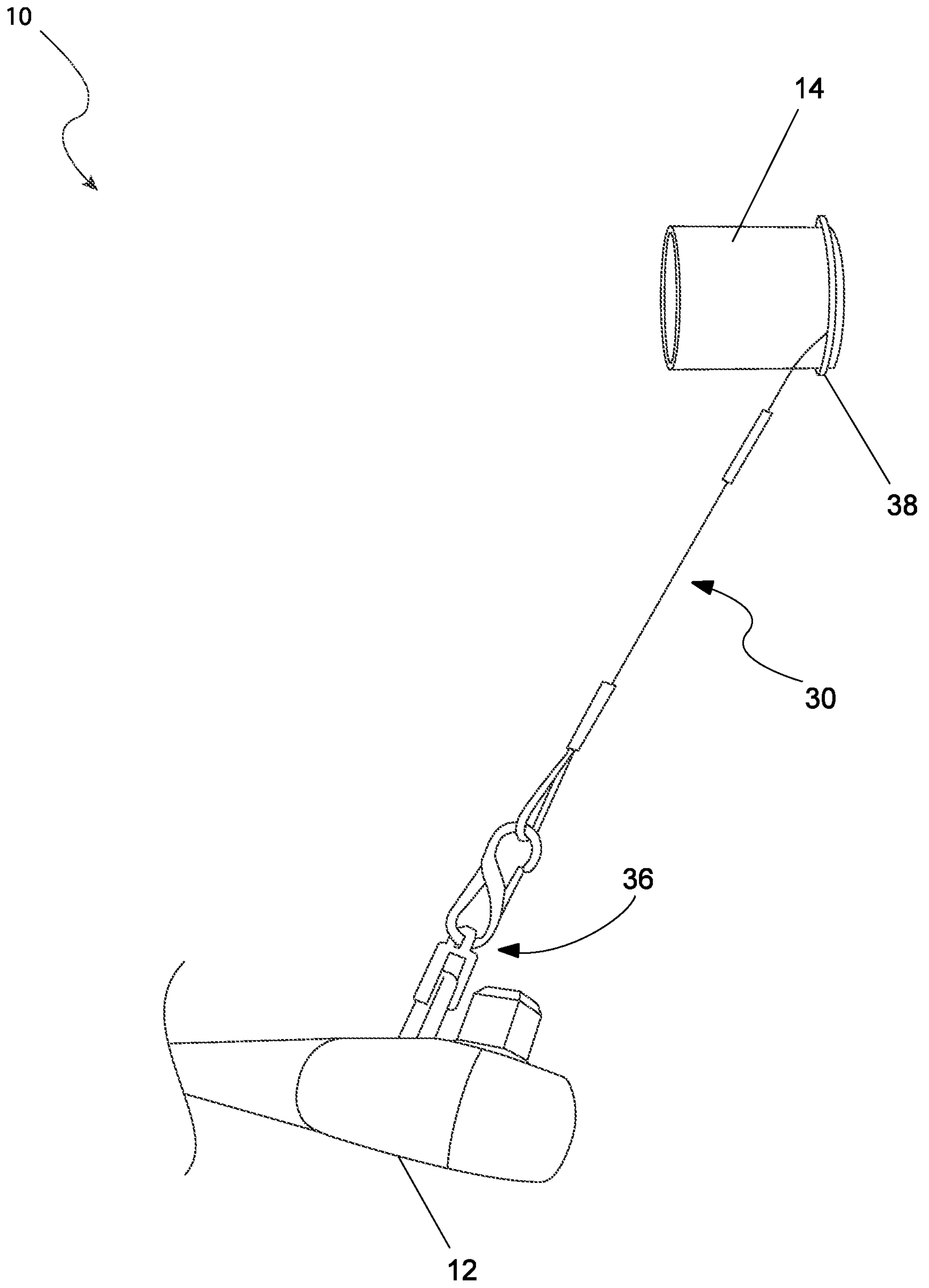
FIG. 2 is a perspective view of the lanyard system, according to an embodiment of this disclosure.
Figure 3:
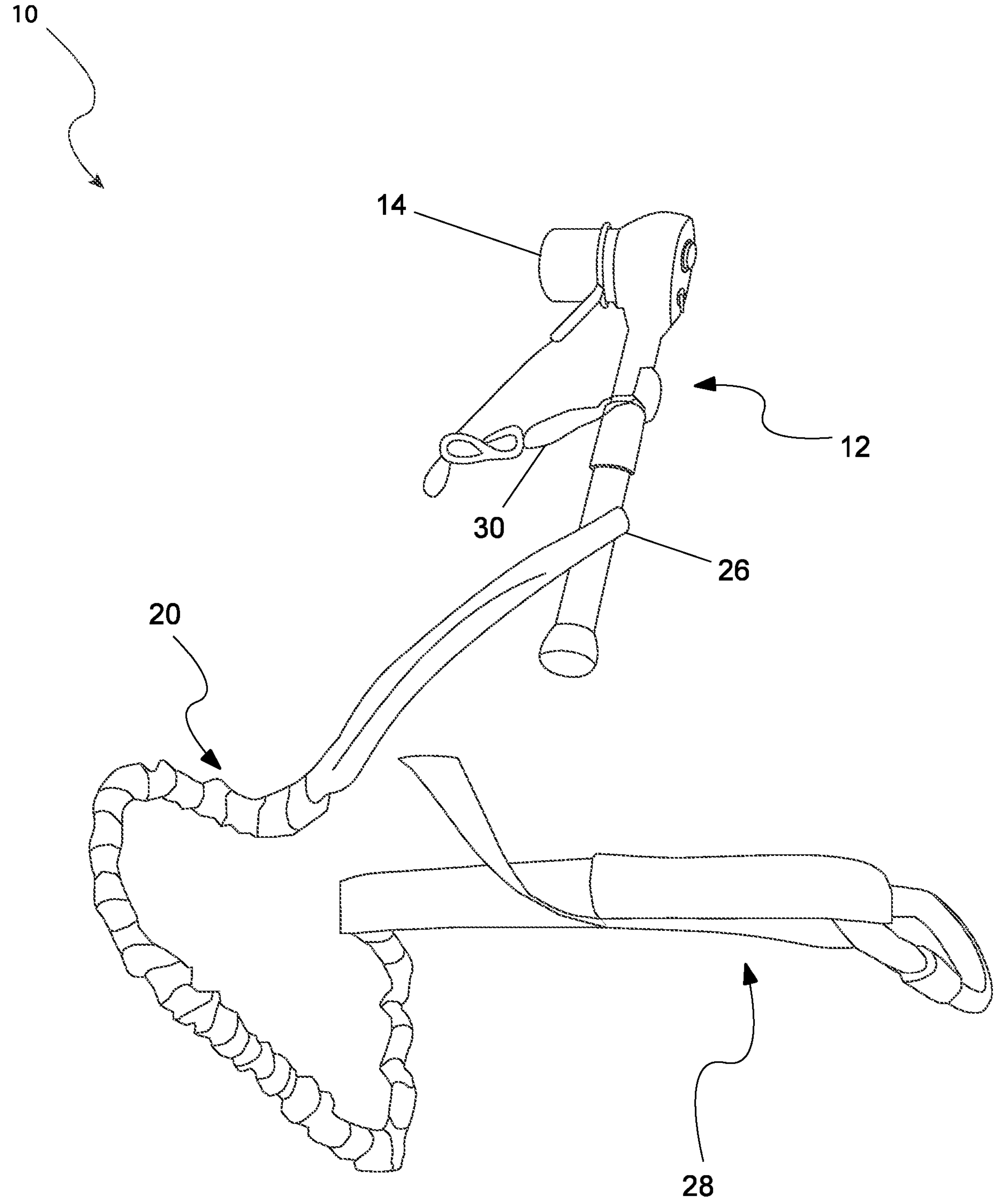
FIG. 3 is a perspective view of the lanyard system, according to an embodiment of this disclosure.
Figure 4:
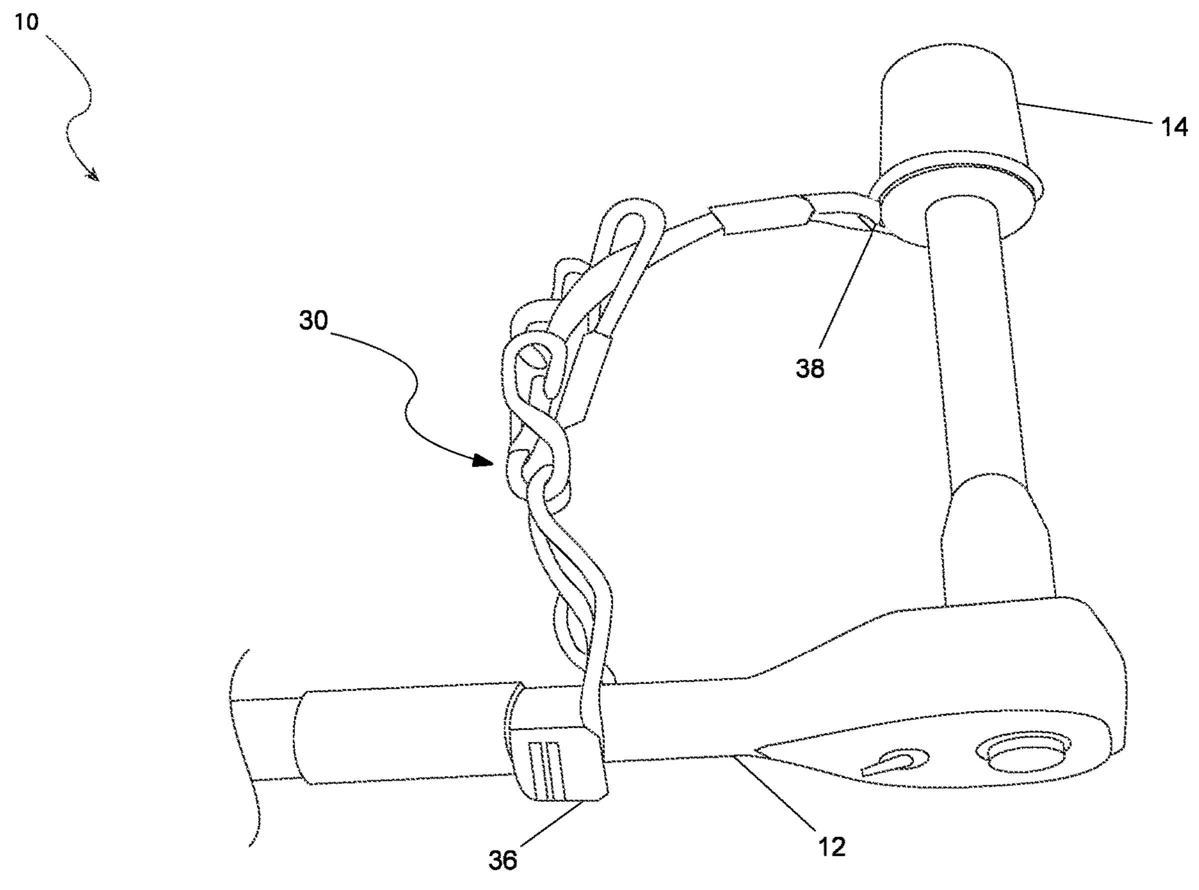
FIG. 4 is a perspective view of the lanyard system, according to an embodiment of this disclosure.

10 lanyard system
12 tool
14 auxiliary tool
20 first lanyard
22 first lanyard first end
24 first lanyard second end
26 first lanyard first connection mechanism
28 first lanyard second connection mechanism
30 second lanyard
32 second lanyard first end

34 second lanyard second end
36 second lanyard first connection mechanism
38 second lanyard second connection mechanism

DETAILED DESCRIPTION

The following disclosure is provided to describe various embodiments of a lanyard system 10 for a tool having various connections. The lanyard system 10 is configured to prevent an auxiliary tool 14 associated with a tool 12, for example, a socket from falling from heights or falling into equipment if it becomes disengaged from the tool 12. In some embodiments, this is very important in the millwright trade, such as power plant turbine and generator assembly and overhaul disassembly. Safety is paramount but foreign material exclusion (FME) during critical path assembly simply means not leaving anything in the unit when you close it and get ready for startup.

Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one (1) or more element in that group, which may be included with other elements of the group. All numbers, measurements, and values are given as approximations unless expressly stated otherwise.

Various aspects of the present disclosure will now be described in detail, without limitation. Skilled readers should not view the inclusion of any alternative labels as limiting in any way. Referring now to FIGS. 1-4, an illustrative lanyard system 10 will now be discussed in more detail.

The lanyard system 10 is configured for use with a tool 12, for example, a socket wrench, that is connectable with an auxiliary tool 14, for example, a socket. The lanyard system 10 includes a first lanyard 20 configured to make a connection between the tool 12 and a user. The first lanyard 20 extends between a first lanyard first end 22 and a first lanyard second end 24. The first lanyard first end 22 includes a first lanyard first connection mechanism 26 configured to attach to the tool 12. In some embodiments, the first lanyard first end 22 may be attachable with the tool 12, for example, via a loop, clips, hooks, knots, hook and loop, integral connection, friction fit, pressure fit, mating engagement, dovetail connection, tongue in groove, clamp, and/or key/key slot. More specifically, the first lanyard first connection mechanism 26 is one or more knots or the like.

The first lanyard second end 24 is configured for connection with the user, for example a user's belt or pants loop. In some embodiments, the first lanyard second end 24 includes a first lanyard second connection mechanism 28. In some embodiments, the first lanyard second connection mechanism 28 may be attachable with the user, for example, via a loop, clips, hooks, knots, hook and loop, integral connection, friction fit, pressure fit, mating engagement, dovetail connection, tongue in groove, clamp, and/or key/key slot. More specifically, first lanyard second connection mechanism 28 is one or more clips and one or more knots or the like.

The lanyard system 10 includes a second lanyard 30 configured to make a connection between the tool 12 and the auxiliary tool 14. The second lanyard 30 extends between a second lanyard first end 32 and a second lanyard second end 34. The second lanyard first end 32 is configured for connection with the tool 12. In some embodiments, the second lanyard first end 32 includes a second lanyard first connection mechanism 36 configured for attachment with the tool 12. In some embodiments, the second lanyard first connection mechanism 36 may include, for example, a loop, clips, hooks, knots, hook and loop, integral connection, friction fit, pressure fit, mating engagement, dovetail connection, tongue in groove, clamp, and/or key/key slot. More specifically, second lanyard first connection mechanism 36 is one or more loops and one or more knots or the like.

The second lanyard second end 34 is configured for connection with the auxiliary tool 14. In some embodiments, the second lanyard second end 34 includes a second lanyard second connection mechanism 38 configured for attachment with the auxiliary tool 14. In some embodiments, the second lanyard second connection mechanism 38 may include, for example, via a loop, clips, hooks, knots, hook and loop, integral connection, friction fit, pressure fit, mating engagement, dovetail connection, tongue in groove, clamp, and/or key/key slot. More specifically, second lanyard second connection mechanism 38 is one or more loops and one or more knots or the like.

In some embodiments, the lanyard system 10 may include a connection 30 means that can be permanently attached with the tool 12 and/or the auxiliary tool 14 to facilitate a quick release use and connection with either lanyard 20, 30. In some embodiments, the lanyard system 10 may include a kit of various sized and/or length of either lanyard 20, 30.

In operation, a user will select a tool 10, for example, a socket wrench and a desired auxiliary tool 14, such as a socket. The user can connect tool 12 with the first lanyard first end 22 of the first lanyard 20 and connect the first lanyard second end 24 with the user's belt or pants. The user can then select the needed sized auxiliary tool 14 and connect it with the second lanyard second end 34 of the second lanyard 30 and connect the second lanyard first end 32 with the tool 12, as shown in FIG. 1. The lanyard system 10 is configured to prevent loss of the auxiliary tool 14 of the tool 12 if dropped.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

What is claimed is:

1. A lanyard system, comprising:

a first lanyard configured to connect a tool and a user, the first lanyard extends between a first lanyard first end and a first lanyard second end; and a second lanyard configured to make a connection between the tool and an auxiliary tool, the second lanyard extends between a second lanyard first end and a second lanyard second end;

wherein the first lanyard first end includes a first lanyard first connection configured to attach to the tool;

wherein the first lanyard first connection is one or more knots;

wherein the first lanyard second end includes a first lanyard second connection configured to attach to the user;

wherein the first lanyard second connection is one or more clips and one or more knots;

wherein the second lanyard first end includes a second lanyard first connection configured to attach to the tool;

wherein the second lanyard first connection is one or more loops and one or more knots;

wherein the second lanyard second end includes a second lanyard second connection configured to attach to the auxillary tool;

wherein the second lanyard second connection is one or more loops; and wherein the user connects the tool with the first lanyard first end of the first lanyard and connects the first lanyard second end with a user's belt.

2. The lanyard system, according to claim 1, wherein the user connects the tool with the first lanyard first end of the first lanyard and connects the first lanyard second end with a user's pants.

3. The lanyard system, according to claim 1, wherein the user selects the auxiliary tool and connects it with the second lanyard second end of the second lanyard and connects the second lanyard first end with the tool.

4. The lanyard system, according to claim 1, wherein the lanyard system is configured to prevent loss of the auxiliary tool of the tool.

5. The lanyard system, according to claim 1, wherein the lanyard system is configured to prevent an auxiliary tool associated with the tool from falling from one or more heights when the auxiliary tool becomes disengaged from the tool.

6. The lanyard system, according to claim 5, wherein the lanyard system is configured to prevent an auxiliary tool associated with the tool from falling into a piece of equipment when the auxiliary tool becomes disengaged from the tool.

7. The lanyard system, according to claim 1, wherein the lanyard system is utilized during foreign material exclusion during critical path assembly.

8. The lanyard system, according to claim 1, wherein the lanyard system is utilized in a millwright trade.

9. The lanyard system, according to claim 8, wherein the lanyard system is utilized with a power plant turbine.

10. The lanyard system, according to claim 8, wherein the lanyard system is utilized with a generator assembly.

11. The lanyard system, according to claim 8, wherein the lanyard system is utilized with an overhaul disassembly.

* * * * *